Figure 1:
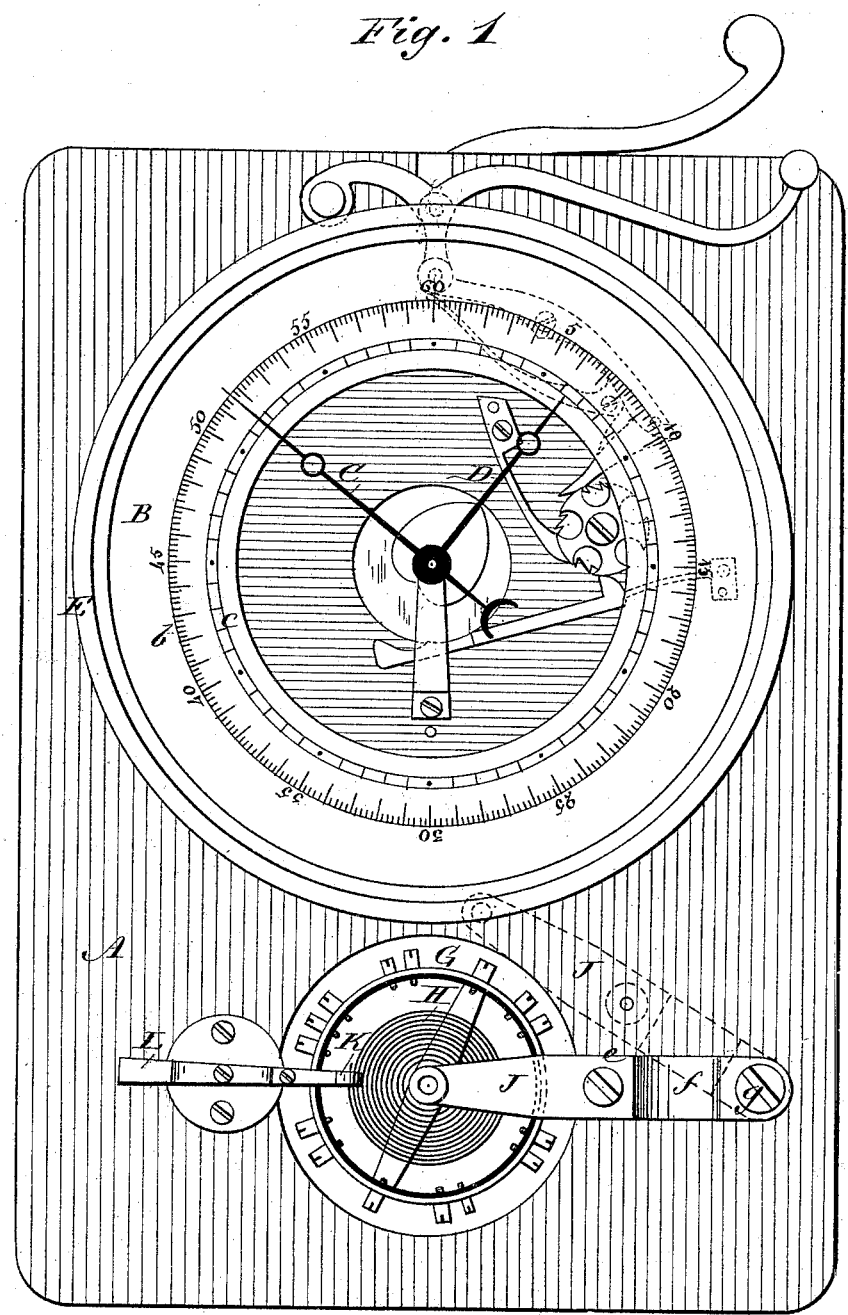

(No Model.) 4 Sheets—Sheet 1.
F. F. IDE.
METHOD OF TESTING BALANCE WHEELS OF WATCHES.

No. 328,847. Patented Oct. 20, 1885.

WITNESSES:
C. Neveux
C. Sedgwick

INVENTOR:
F. F. Ide
BY Munn & Co
ATTORNEYS.

(No Model.) 4 Sheets—Sheet 2.
F. F. IDE.
METHOD OF TESTING BALANCE WHEELS OF WATCHES.
No. 328,847. Patented Oct. 20, 1885.

WITNESSES: INVENTOR:
C. Neveux F. F. Ide
C. Sedgwick BY Munn & Co
ATTORNEYS.

(No Model.) 4 Sheets—Sheet 3.
F. F. IDE.
METHOD OF TESTING BALANCE WHEELS OF WATCHES.
No. 328,847. Patented Oct. 20, 1885.

WITNESSES: INVENTOR:
C. Neveux F. F. Ide
C. Sedgwick BY Munn &Co
ATTORNEYS.

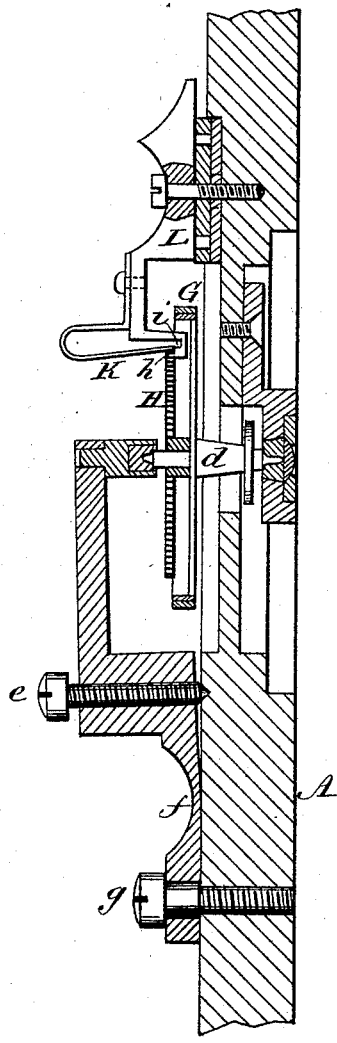

UNITED STATES PATENT OFFICE.

FERDINAND F. IDE, OF SPRINGFIELD, ILLINOIS.

METHOD OF TESTING BALANCE-WHEELS OF WATCHES.

SPECIFICATION forming part of Letters Patent No. 328,847, dated October 20, 1885.

Application filed May 12, 1882. Serial No. 61,133. (No model.)

*To all whom it may concern:*

Be it known that I, FERDINAND F. IDE, of Springfield, in the county of Sangamon and State of Illinois, have invented a new and Improved Method of and Apparatus for Ascertaining the Governing-Power of Balance-Wheels for Watches and other Time-Pieces, of which the following is a full, clear, and exact description.

Ordinarily it is customary in applying balance-wheels to watches and other time-pieces to weigh the balances in ordinary balance-scales and to gage the springs with an ordinary spring-gage; then to take one of said balances and one of said springs, supposed to be suitable each to the other, and place them in a watch or vibrator and run them for the purpose of ascertaining the vibration of the two in connection. If not correct to standard time, which they seldom are, owing to variations in the proportions of the parts of balances having the same weight, the method pursued has been either to pin or unpin the spring, for the purpose of increasing or diminishing its strength by shortening or lengthening it, or to change the spring for another, the spring in each case being the one that is intended to remain, or to change the adjusting-weights in the balance. All of this, however, is troublesome, and where resort is had to shortening or lengthening the spring very objectionable, inasmuch as the spring should be of a certain size, so that it will occupy an invariable position relatively when at rest to the inside pinning with the collet and outside pinning in the stud, the two pinnings forming what is known as the "isochronal quarters," whereas the unpinning and lengthening or shortening of the spring not only injures and disfigures it, but makes it either too large or too small. On the other hand, when it is attempted to make the necessary adjustment by increasing or diminishing the weight of the balances to bring them to proper time in connection with the springs much time is necessarily consumed. My invention removes these difficulties by ascertaining the governing power of the balance-wheel and applying a spring to suit, as follows: I take, for instance, a number of corresponding balance-wheels— that is, wheels of the same or a given quality— and ascertain by means of a pair of balance-scales the weight of each or of a certain number of them, and first select one of average weight or governing power and run it in connection with a spring (the strength of which has been previously determined) in a time-piece or indicating-vibrator, and note on a schedule the deviation of said balance-wheel from time in connection with said spring, which is made the standard hair or governing spring for all future tests with balances of like quality. The deviation recorded on the schedules applies to all balances of like deviation. I next remove the standard spring and time the balance in the ordinary manner by running it in connection with another spring, which is lengthened or shortened, for the sole purpose of finding a spring of the required strength to vibrate correct time in any watch of the number of vibrations for which it is intended. Such selected and timing spring has the proper strength, although it may not be of the proper size or proportions; but any spring of the same strength as said spring and of proper size and proportions will cause said balance to keep correct time in any watch of the number of vibrations for which it is intended. The strength of this service or timing spring is then registered on the schedule, hereinbefore referred to, for use in connection with any balance of like quality that may indicate the same rate on the indicator as did the first balance in connection with the standard spring, or any spring of the same strength as the standard spring. A number of similar timing tests are made with others of the series of balance-wheels from which the first balance-wheel was selected, and their deviations in connection with the standard spring and necessary strengths of springs to bring them to time, are similarly noted on the schedule. In this way a schedule is made from which a spring of the necessary strength for any balance-wheel may readily be selected, such spring being taken from a stock of springs that have previously been vibrated or gaged and labeled according to their relative strength, it only being necessary to select a spring of the indicated strength on the schedule which will correct or neutralize the deviation of the balance-wheel under trial when run in connection with the standard spring, as shown by the previous tests from which the schedule was formed. Thus, supposing a balance-wheel, when run in connection with the standard spring, shows a gain on mean time of five seconds in five minutes, any spring, as appears on the schedule, that shows a loss of five seconds in five minutes, or any spring that gages the same as such a spring, will cause said balance to keep correct time. A suitable spring for any balance-wheel may accordingly be selected from the schedule without delay. This method of ascertaining the governing power of balance-wheels, and the proper springs suitable for them, is not restricted to any size and proportion of balances and springs, but only requires proper schedules to be made suitable for balances and springs of greatly different governing power and weights and strengths, and having different numbers of vibrations in a given time.

Reference is to be had to the accompanying drawings, forming part of this specification, in which similar letters of reference indicate corresponding parts in all the figures.

Figure 2:
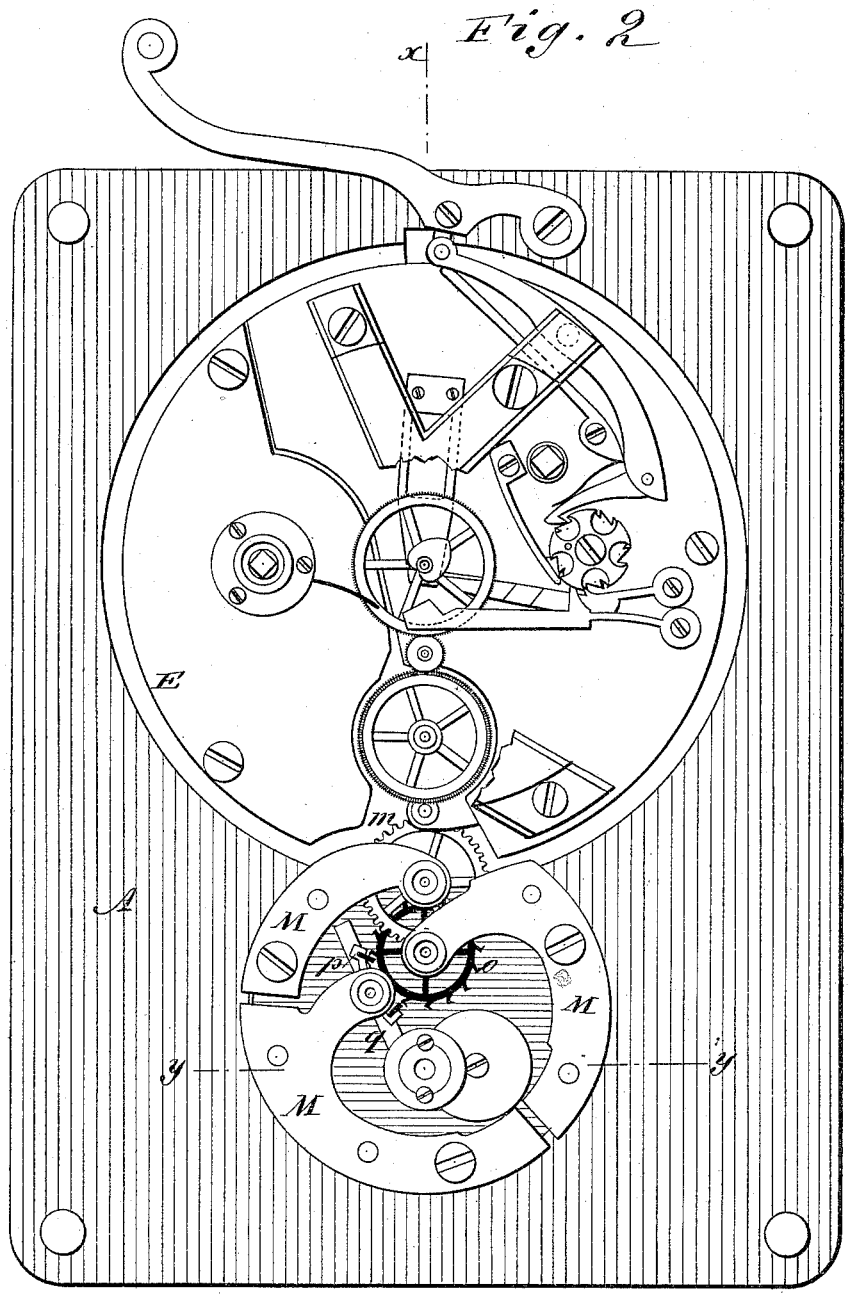
Figure 3:
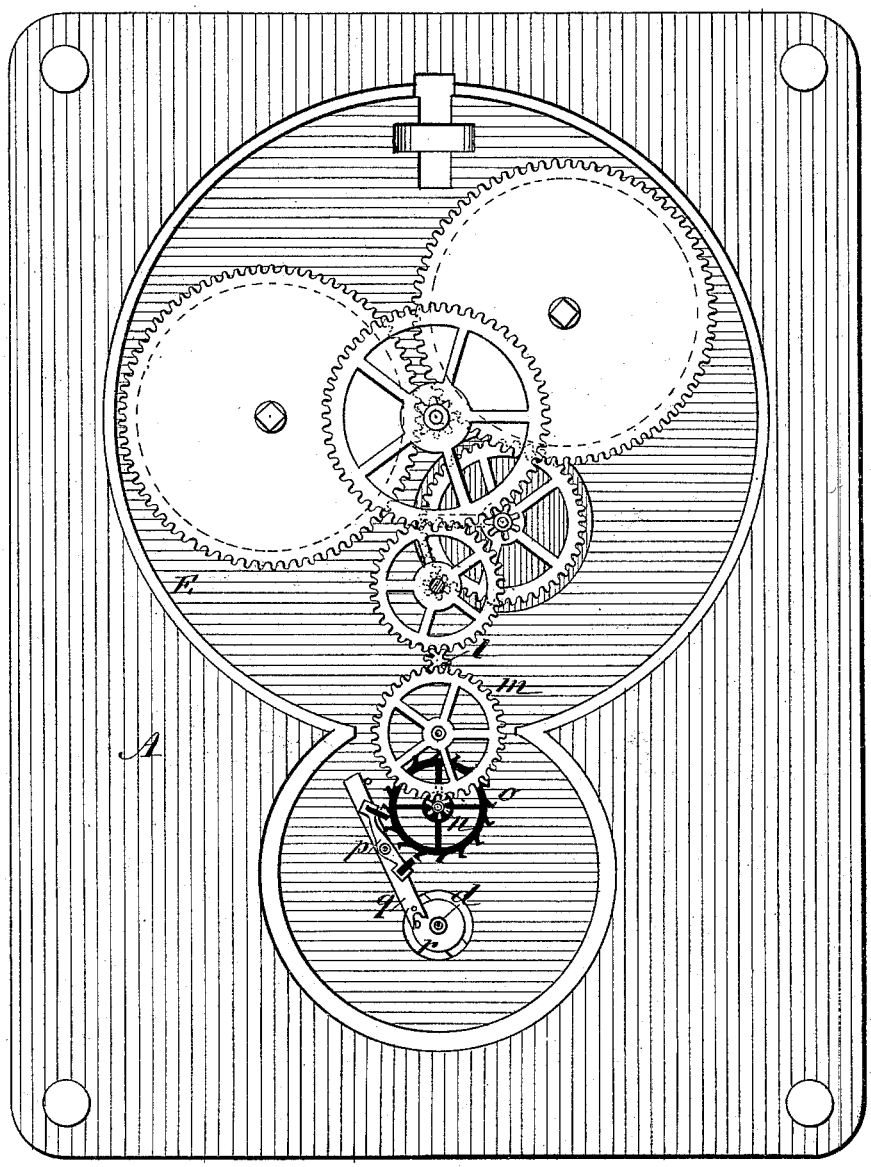

Figure 1 represents a top or outside view of an apparatus adapted to and forming part of my invention. Fig. 2 is an inverted plan of the same, with an outer cover or case removed for the purpose of showing the interior mechanism. Fig. 3 is a similar inverted view, but with more of the parts, including certain plates or supports, removed to more fully expose the working details. Fig. 4 is a longitudinal section on the line $x\,x$ in Fig. 2, with the board, stand, or plate which carries the apparatus removed; and Fig. 5 a transverse section, upon a larger scale, on the line $y\,y$, in Fig. 2.

The apparatus represented in the drawings, and which is shown as secured on a plate, A, is what may be termed a "divided-second watch," or, in other words, a watch or chronometer which indicates divisions or parts of seconds on its dial B, the outer circular row, $b$, of divisions representing seconds and their subdivisions, and the inner circular-divided scale, $c$, indicating minutes. Furthermore, the instrument is provided with suitable means for instantly stopping and starting it.

C indicates the second-hand, and D the minute-hand, of said instrument or apparatus.

Having thus specified the description of stop time-piece which I prefer to employ, it may here be observed that its movements and working details are or may be similar to such time-pieces in ordinary use, so that it will be unnecessary here to refer by letter, or otherwise in detail, to its mechanism or other parts, as shown in the drawings, excepting wherein the same differ in their arrangement and construction. This difference is notably in the disposition of the balance and its immediate attachments or connections, all of which are arranged outside of the plates commonly used and beyond the ordinary case, E, of the watch, and so that the balance-wheel G and balance-spring H can be seen in the same view with the dial B, to one side of which diametrically said wheel and spring are situated, as shown in Figs. 1 and 4. Another point of difference is that the bridge J, which holds the top pivot of the balance-staff $d$, is constructed and attached so that it can be quickly and easily raised from the pivot and turned back or to one side, as shown by dotted lines in Fig. 1, in order that the balance with its attachments may be quickly and easily removed and replaced, and said bridge afterward be returned to its proper place. Another point of difference, too, is in the means used to hold the balance-spring, which means is constructed to provide for the ready hold and release of said spring when necessary.

To provide for the manipulation or adjustment of the bridge J, as described, said bridge, which has a holding and adjusting screw, $e$, to adapt it to the staff, is of a spring or elastic construction at $f$, and is pivoted in its rear, at $g$, to the stand, whereby it may be readily raised from the top of the balance-staff and be turned away therefrom, and afterward be again adjusted to its normal position, as required. This construction and attachment of said bridge is shown in Figs. 1 and 5, which figures also show the means used to hold and release the balance-spring H, the same consisting of a bent spring, K, secured at its one end to a bridge or support, L, and holding at its free end the outer end of the balance-spring against the wall of an upper step, $h$, which is pendent from the front of the support L. By pressing the free arm of the spring K inward, it is released from its hold on the balance-spring and made to engage with a lower notch or step, $i$, in the support L, whereby the balance-spring is free to be removed, together with the balance-wheel, and to be replaced by another balance-wheel, but same spring, after which the spring K is released to resume its holding position on the balance-spring.

In Fig. 2 M M indicate the plates for holding the mechanism by which motion is transmitted to the balance outside of the regular or dial case of the watch diametrically, the ordinary operating-pinion $l$, from which such motion is derived, being suitably disposed for the purpose and gearing with the wheel $m$, arranged to extend beyond the case E, which wheel engages with the pinion $n$ on the arbor of the escapement-wheel $o$, that extends still farther beyond said case and operates the anchor $p$, attached to the notched or forked arm $q$, which engages with a jewel on the roller-plate $r$, for giving the necessary vibratory motion to the balance-staff $d$, as shown in Figs. 2, 3, and 4.

In using the apparatus in connection with a schedule prepared as hereinbefore described, for ascertaining the governing power of a balance-wheel and spring suitable for it, said wheel G is first run in the apparatus in connection with the standard spring H, and the deviation of the balance from time, as shown on the dial B, compared with the chronometer or time-register, is noted and compared with the schedule, which will show the strength of spring necessary to correct such deviation and run the balance on time. Said balance-wheel and standard spring are then removed from the apparatus, the standard spring detached from said wheel, and a proper spring, as shown by the schedule, applied to it, which leaves the balance with attached spring ready for use in a watch or other time-piece. The standard spring is then applied to another balance-wheel and the two inserted in their place in the apparatus shown in the drawings, for ascertaining the governing power of such wheel and proper spring suitable for it, as in the previous instance, and so on indefinitely for any number of balance-wheels.

The spring-clamp K and movable bridge J provide for the removal and replacement of the balance-wheels and standard spring, as described, in a very simple, rapid, and easy manner.

It may here be observed that the standard spring may at any time, or during the testing of the balance-wheels to be supplied with springs of different strengths, as shown by the schedule, be replaced by a duplicate or counterpart, which then becomes the standard spring.

I am aware that a service for more rapidly adjusting hair-springs, according to the old and common practice, is shown in Patent No. 105,467, which practice is to attach the hair-spring permanently to the balance-wheel staff, then pull or push the spring along between a holder until by training a proper length of the spring for each wheel is formed, and then the spring is broken off to preserve the limit so found. This method of adjusting hair-springs to balance-wheels is at all times liable to give a strained or forced combination between the two, as a strong spring is given an extra length for a light wheel and a light spring shortened up to balance a heavier wheel. All of this is avoided by my method and the use of my device, as by it I adapt each spring to its proper wheel and each wheel to a proper spring without pulling or pushing the spring unnaturally and without breaking them off.

I do not wish to be understood as here claiming the apparatus set forth in this application, as the same is fully set forth and claimed in another application filed by me September 11, 1885, Serial No. 176,813.

Having thus fully described my invention, what I claim as new, and desire to secure by Letters Patent, is—

The method herein described of assembling balance-wheels and hair-springs of time-pieces so as to have a standard rate of vibration, which consists in first ascertaining the rate beat of untested balance-wheels by substituting them in place of a standard balance-wheel, when driven by a standard train and actuated by a standard hair-spring, and then selecting a suitable hair-spring to give said balance-wheel a standard rate of vibration, substantially as specified.

FERD. F. IDE.

Witnesses:
  A. GREGORY,
  C. SEDGWICK.